(12) United States Patent  
Slutskiy et al.

(10) Patent No.: US 6,242,850 B1  
(45) Date of Patent: Jun. 5, 2001

(54) PIEZOELECTRIC MOTOR AND A DISK DRIVE USING SAME

(75) Inventors: Imanuil A. Slutskiy, Far Rockaway, NY (US); Alexandr I. Slutcky, Tel Aviv (IL)

(73) Assignee: Technology Commercialization Corp., New York, NY (US)

( * ) Notice: Subject to any disclaimer, the term of this patent is extended or adjusted under 35 U.S.C. 154(b) by 0 days.

(21) Appl. No.: 09/542,062

(22) Filed: Apr. 3, 2000

Related U.S. Application Data

(63) Continuation-in-part of application No. 09/362,139, filed on Jul. 28, 1999, now Pat. No. 6,068,256.

(51) Int. Cl.[7] .................................................. H02N 2/00
(52) U.S. Cl. ................................. 310/328; 310/323.02
(58) Field of Search ......................... 310/323.01, 323.02, 310/328

(56) References Cited

U.S. PATENT DOCUMENTS

| 3,211,931 | 10/1965 | Tehon ................................... 310/8.3 |
| 4,019,073 | 4/1977 | Vishnevsky ............................ 310/8.2 |
| 4,249,100 | * 2/1981 | Vasiliev et al. ..................... 310/323.01 |
| 4,400,641 | 8/1983 | Vishnevsky ............................ 310/323 |
| 4,453,103 | 6/1984 | Vishnevsky ............................ 310/323 |
| 4,959,580 | 9/1990 | Vishnevsky ............................ 310/323 |
| 5,140,566 | 8/1992 | Kang ...................................... 369/13 |
| 5,144,187 | 9/1992 | Culp ....................................... 310/328 |
| 5,162,692 | 11/1992 | Fujimura ............................... 310/323 |
| 5,532,541 | 7/1996 | Fujishima ............................. 310/325 |
| 5,600,613 | 2/1997 | Matsumoto ............................ 369/32 |
| 5,805,540 | 9/1998 | Kitai ...................................... 369/44.28 |
| 5,877,579 | * 3/1999 | Zumeris ................................. 310/323.01 |
| 6,068,256 | * 5/2000 | Slutskiy et al. ....................... 271/264 |
| 6,081,063 | * 6/2000 | Kasuga et al. ........................ 310/323.02 |
| 6,121,717 | * 9/2000 | Diefenbach et al. ................. 310/323.02 |

FOREIGN PATENT DOCUMENTS

| 19710601A1 | 9/1998 | (DE) ............................... F16H/35/08 |
| 524222 | 8/1976 | (RU) ............................... G11B/25/04 |
| WO 95/15610 | 6/1995 | (WO) .............................. H02N/11/00 |

* cited by examiner

Primary Examiner—Thomas M. Dougherty  
(74) Attorney, Agent, or Firm—Boris Leschinsky

(57) ABSTRACT

A piezoelectric motor of a linear contact type contains one or more actuators placed about a rotor. Each actuator contains at least one piezoelectric vibrator with a working end urged against the rotor. Periodic oscillations of each vibrator cause compressions of the rotor not exceeding its natural elastic compression limit so after its compression the rotor fully restores its initial cylindrical shape. Such elastic compressions ensure longer operational life of the motor. In another embodiment, each actuator has a laminated design with at least two vibrators separated by an isolator. The isolator extends beyond the vibrators and has appropriate hardness to engage with the rotor. A rotor of laminated design is also described to achieve the optimum hardness relative to the hardness of the actuators. The hardness of the vibrator is about $5 \times 10^7$ N/cm$^2$ and much higher than the hardness of the rotor being about $2 \times 10^6$ N/cm$^2$. A disk drive is described as one of the most advantageous applications of the motor of the invention to drive optical and magnetic disks such as in a CD-ROM drive etc.

37 Claims, 3 Drawing Sheets

PIEZOELECTRIC MOTOR AND A DISK DRIVE USING SAME

CROSS-REFERENCE DATA

This is a continuation-in-part of our U.S. patent application Ser. No. 09/362,139 filed Jul. 28, 1999 now U.S. Pat. No. 6,068,256 which is incorporated herein by reference in its entirety.

BACKGROUND OF THE INVENTION

1. Field of the invention

The present invention relates generally to a piezoelectric motor and in particular to a piezoelectric motor with one or more actuators having a linear contact with the rotor which can be used generally as a high performance replacement for small conventional electric motors used in computer equipment, robotics, manufacturing equipment, aerospace, automobiles, toys, etc. The motor of the present invention can be used particularly effectively in various disk drive devices such as for magnetic and optical data storage equipment, especially when small size and weight are required for compactness.

2. Description of the prior art

In order to develop adequate torque, to control/reduce revolution speed and to achieve desired positioning accuracy, many conventional electric motors rated under 10 watts operate at higher revolution speeds and use gearing mechanisms to reduce RPMs. Small electric motors typically have efficiency ratings in the general area of 50% to 75%. With miniature motors under 2 watts, efficiency declines below 50%. Also, the parasitic losses from the gearing mechanism become proportionately more significant. Power available at the shaft may be generated at an efficiency of only 10% to 25%.

Also, as the diameter of a motor becomes very small, its torque generating capability declines because torque is the product of force times the distance it is applied from the shaft axis. This limits the ability to reduce size (diameter) and weight. Start-stop dynamics are poor with electric motors because of the inertia of the rotor. Additionally, the combined electric motor and gearing mechanism includes many, many parts and its manufacture becomes more difficult and complex as they become very small.

Piezoelectric ultrasonic motors were invented over 30 years ago. Their basic operating mechanism is that when voltage is applied across a piezoelectric material, for example a quartz crystal, it causes the crystal to change its shape, or bend. When voltage of an opposite sign is applied, the crystal bends the opposite way. If alternating current is applied to the crystal, it vibrates at the frequency of the alternating current. Piezoelectric motors operate by placing a vibrating piezoelectric element in contact with another free moving element, inducing its rotation or movement. Controlling the contact mechanics between these two elements has always been a large part of developmental efforts for piezoelectric motors.

Piezoelectric ultrasonic motors have many advantages over small conventional electromagnetic motors, especially those rated less than two watts. They are variable speed motors with high torque at low revolution speeds, allowing for the elimination of gear mechanisms. They are quiet and more energy efficient. Their power density does not decline with size so they gain an increasing comparative advantage as the size of the motor declines. They have greater positioning accuracy-they are like stepper motors with each step being less than 10 microns. Response time is up to ten times faster and stability is better. The electronic controls can be more simple. When the motor is turned off, it resists shaft movement. They are much less sensitive to extreme ambient temperature environments. Lastly, they produce no environmental electromagnetic fields.

Two broad categories of piezoelectric motors can be identified analyzing the prior art:
- motors with a "surface contact" in which the area between the piezoelectric driving element and the rotor or other driven structure is wide so that it is the surface of the vibrating actuator itself that provides a firm contact with and ultimately propels the rotor, and
- motors with a "linear contact" in which the area between the piezoelectric actuator and the rotor has a small width of about 0.5 mm or less.

Surface contact piezoelectric motors are quite reliable, and typically utilize a "traveling wave" principle, containing at least one piezoelectric disc divided into a multitude of driving piezoelectric sectors that bend in a coordinated fashion to produce a wave which induces a contacting surface to rotate or move. Linear contact motors, also known as "standing wave" motors, typically have a vibrating element creating an elliptical orbit at its working end, which pushes the driven member by frictional contact. Given the small area of contact and the abrasive nature of the interaction, the useful life of these motors is small, ranging from 1to 3,000 hours.

Surface wear is much less of a problem for traveling wave motors due to their larger contact area. Most piezoelectric motor developmental efforts have been on the traveling wave type because they are capable of much higher torque levels and have a much longer useful life. Compared to the standing wave type, they are much more expensive and complex, require more complicated electronics, are less energy efficient and have less positioning accuracy.

Even though they have many performance advantages, piezoelectric motors have very few commercial applications. This is primarily due to cost. Traveling wave piezoelectric motors are very expensive. Standing wave motors are an order of magnitude less in cost, but the expected useful life of current designs is not acceptable. For all piezoelectric motors, manufacturing economies of scale have never been achieved due to the limited volume of their small, often custom, applications base.

Piezoelectric motors are now used in industry in applications when small size, quiet operation, high performance and high efficiency are required. One limitation of such devices is their limited torque. In order to increase the torque and widen the application of the motor it is known to utilize more than one actuator driving the same rotor.

An example of a traveling wave piezoelectric motor can be found in the U.S. Pat. No. 5,532,541 by Fujishima. An ultrasonic motor of this invention has a plurality of so called Langevin vibrators arranged in a ring. Each of the vibrators has a first and a second polarized region. When alternating voltage is supplied to the vibrators, the edges of the metal terminals move in an elliptical motion, which drives the rotor.

This and other similar devices of that type have intrinsically limited energy efficiency due to the fact that the bias force needed to maintain a good friction engagement between the stator and the rotor over a large contact area have to be substantial. In addition to the energy losses, shortened operational life results from these significant bias forces which cause deterioration of the contact surface.

Linear contact piezoelectric motors represent another type of an ultrasound motor. Most known devices of this type contain a "standing wave" vibrational element in which the working edge of a piezoelectric member moves in a cyclical pattern and is placed in direct contact with the rotor. Example of such device can be found in U.S. Pat. No. 3,211,931 by Tehon which describes a motor having a magnetostrictive or electrostrictive element transmitting torque through a series of mechanical couplers with an edge contact to a rotating shaft.

A number of designs for such motors is described by Vishnevsky et al in U.S. Pat. Nos. 4,019,073; 4,400,641; 4,453,103; and 4,959,580 all of which are incorporated herein by reference. In addition to depicting the general principles of a linear contact motor, these patents propose a number of designs with multiple actuators. According to the invention, in these designs a single rotor is typically activated by a number of radially placed piezoelectric vibrators. Such designs are generally useful for the purposes of increasing the motor torque while maintaining the compact nature of the motor. Still, among fundamental disadvantages of the piezoelectric motors of the prior art and specifically the designs depicted in these patents, one can point to the limited operational life which is a direct consequence of the nature of actuator/rotor interaction. When two hard surfaces interact according to this and other prior art designs, the rotational energy is transferred predominantly by friction. To avoid slippage of the rotor relative to the actuator and to transmit higher torques, the bias forces have to be quite high once again which leads not only to a reduction of energy efficiency but also to eventual disintegration of the motor elements which reduces the limits of the operational life. As our studies have demonstrated, in a typical case the operational life of this motor is limited to only 1 to 3 thousand hours or less which renders the practical applicability of the motor problematic. There is a need therefore for a piezoelectric motor with a linear contact having higher reliability and extended operational life of at least 5 thousand hours or more.

As was pointed out in our Russian Patent No. 524,222, piezoelectric motors can be used advantageously in the area of disk drives and turntable devices. For the purposes of this specification, the term "disk" includes a variety of electronic data storage devices such as optical and magnetic disks, computer hard drives, CD-ROM and other compact disks, media storage devices such as sound records etc. The advantage of piezoelectric motors is in their quiet operation, improved performance, small size, attractive shape and diameter/height ratio. In general, the use of piezoelectric motors in this area of technology is described for example in U.S. Pat. Nos. 5,805,540 by Kitai, 5,140,566 by Kang, and 5,600,613 by Matsumoto.

In spite of the known advantages of the piezoelectric motors, the motors of the prior art did not find widespread use in the disk drive area because of the above mentioned limitations, mainly the low energy efficiency (which depletes the batteries for some of the portable disk drive devices such as in a lap top computer) and the limited operational time. The need exists therefore for an improved low power disk drive device of the linear contact type with extended operational life. Such device would allow the utilization of all intrinsic advantages of this type of motors and therefore allow for significant improvements in performance through the reduction in weight and size of computers and other general devices requiring a disk drive function.

Other applications requiring high performance electric motors (either motors that use a rotor or those referred to as linear motors) of small size would find attractive the higher performance characteristics of piezoelectric motors if their cost was lower and more competitive with conventional motors.

SUMMARY OF THE INVENTION

Accordingly, it is an object of the present invention to overcome these and other drawbacks of the prior art by providing a novel piezoelectric motor of linear contact type with improved operational life.

Another object of the invention is to provide a piezoelectric motor with multiple actuators driving a single rotor with increased torque while ensuring extended operational life of the motor.

Another object of the invention is to provide a piezoelectric motor with a single or with multiple actuators driving a single rotor and having high energy efficiency.

Yet another object of the invention is to provide a disk drive with a central shaft driven by a piezoelectric motor with one or more actuators to allow for reduced size and weight.

A further object of the present invention is to provide a piezoelectric motor with linear contact in which the interaction between the actuator and the rotor is based predominantly on elastic compression rather then on friction.

A further yet object of the invention is to provide a piezoelectric motor with an actuator adapted to compresses the surface of the rotor within elastic limits thereof, in which case the surface of the rotor fully restores its initial geometry after the compression from the actuator is removed.

And finally, the other object of the present invention is to provide a piezoelectric motor having an improved performance and lower manufacturing cost.

According to the invention, the motor contains a rotor and a piezoelectric actuator placed in linear contact with the rotor and urged against it by a bias spring. The actuator of the present invention engages the rotor along a narrow line extending along its axis of rotation. In its most basic version, it contains a piezoelectric vibrator of rectangular shape polarized along its thickness and attached at one end to the device housing through an elastic insert designed to isolate the oscillations of the piezoelectric vibrator from the rest of the device. As can be appreciated by those skilled in the art, piezoelectric vibrator can be made of an appropriate ceramic material and can optionally be laminated. At the other end of the vibrator also known as a working end, an edge insert is placed over the vibrator along the area of linear contact with the rotor. This edge insert is made of a hard to compress and wear resistant material such as corund ceramic material or alike.

A critical element of the piezoelectric motor of the present invention is a bias member for urging the working end of the vibrator in contact with the rotor. This bias member is a spring, preferably a flat leaf metal spring, compressing the working end of the vibrator using another elastic insert designed not to interfere with the oscillations of the vibrator. The urging force of the bias member may be optionally adjusted by an adjustment screw.

The piezoelectric vibrator contacts the rotor at a contact angle which is defined as an angle between the vibrator plane and the plane tangential to the rotor along the line of contact with the vibrator. According to the present invention, this contact angle is preferably about 45 degrees.

Applying an alternating electrical current to the piezoelectric motor with a preferred frequency close to that of a longitudinal resonance frequency of the vibrator leads to the periodic elongations and contractions of the vibrator along its length. Every elongation of the vibrator leads to engagement of a working end edge insert into a generally softer and more elastic surface of the rotor forming a line of contact. Continuing elongation of the vibrator creates a microgroove and moves this line of contact around the center of the rotor which in turn leads to a small rotational movement of the rotor. Every contraction of the vibrator disengages its working end from the surface of the first roller and returns it to the initial position leaving the rotor in its slightly turned position while its elastic surface returns to its initial cylindrical shape. The next elongation of the vibrator engages the rotor again forming a new line of contact and a new microgroove in a new place which turns it further in a direction of rotation.

As discussed above, linear elongation of the vibrator forms a line of contact with the rotor and in turn leads to its rotation. At the same time, the working end of the vibrator not only moves linearly closer and away from the other end but also moves in a direction perpendicular to the plane of the vibrator causing bending oscillations of the vibrator. Since in the vicinity of the line of contact the working end is subjected to both longitudinal and bending oscillations at a preferred frequency close to the longitudinal resonance frequency of the vibrator, both oscillations interfere with each other. Therefore, phase relationship between these oscillations is an important design parameter of the piezoelectric motor. Optimally, the frequency of oscillations should not be only close to the longitudinal resonance frequency of the vibrator but also close to its bending resonance frequency. It is typically achieved by choosing an appropriate ratio between the length and thickness of the piezoelectric vibrator.

As was pointed out above, general design principles of a linear piezoelectric motor are outlined in detail in the U.S. Pat. No. 4,019,073. It discusses a piezoelectric motor in which both the working end and the rotor are made of extremely hard materials such as ceramics or glass with Young's modulus E higher than about $2 \times 10^7 \text{N/cm}^2$. In that case, the interaction between these two parts are purely frictional and the relative deformations $\epsilon$ along the line of contact does not exceed the value of 0.0001 while the absolute deformations are less than about 1 micron. As mentioned above, such interaction leads to a premature wear of one or both parts and limits the operational life of the device.

According to the present invention, the interaction between the vibrator and the rotor is based on a contact between a hard working end of the vibrator with a Young's modulus $E_V$ in the range of between $1 \times 10^7 \text{N/cm}^2$ and $10 \times 10^7 \text{N/cm}^2$ and preferably about $5 \times 10^7 \text{N/cm}^2$ and a generally softer and more elastic surface of the rotor having a Young's modulus $E_r$ in the range of between about $0.5 \times 10^6 \text{N/cm}^2$ and about $5 \times 10^6 \text{N/cm}^2$ and preferably about $2 \times 10^6 \text{N/cm}^2$.

Such difference between the hardness of the working end of the vibrator and the surface of the rotor leads to a different interaction between these two parts of the device. Engagement of the hard edge of the working end of the vibrator with the rotor leads to an elastic compression of the surface to a certain predetermined depth forming a microgroove during the time when both parts move together. Subsequent contraction of the vibrator disengages both parts and the elastic surface of the rotor restores its initial shape. During the elongation/contraction cycle, the working edge of the vibrator undertakes a complex geometrical motion, trajectory of which is a result of both the frictional and elastic compression interaction between the vibrator and the roller. Should the phase shift between the longitudinal and the bending oscillations of the vibrator be about $\pi/2$, this trajectory becomes continuous and close to the shape of an oval. In addition to the friction and elastic deformation of the roller by the vibrator, a wedging effect occurs when the contact angle is about 45 degrees which can be utilized to further increase the rotational torque by about additional 30 to 40%.

In accordance with the present invention, extended operational life of the device can be achieved by ensuring the depth of compressions of the rotor not exceeding its elastic limit. In that case, every compression of the rotor by the vibrator is purely elastic and no permanent deformation occurs which may lead to premature wear and surface damage. Elastic materials for the rotor and the main parameters of the vibrator are chosen in such a way that the relative deformation $\epsilon$ along the line of contact of the rotor surface does not exceed about 0.001.

Another benefit of the wedging of the vibrator into the less hard rotor surface is that there is less slippage between the contact surfaces than when there is only frictional contact. Slippage between the contact surfaces increases when a load is placed against the rotor shaft and when the motor is initially turned on, until it reaches its resonant frequency. Higher slippage rates are associated with declining efficiency and positioning accuracy. It is not uncommon in the art to employ a sensor on the shaft to relay positioning information to the controller for purposes of eliminating the positioning inaccuracies caused by slippage between the contact surfaces.

Increased torque is achieved by employing two or more actuators. In that case, multiple piezoelectric vibrators are interacting with a single rotor preferably all at the same time allowing for increase of the motor torque without changing the rotor diameter or a significant increase of the motor size and weight. In addition to the above mentioned advantages, the design of the motor of the present invention allows reduction of the response time down to about 5 ms.

BRIEF DESCRIPTION OF THE DRAWINGS

A more complete appreciation of the subject matter of the present invention and its various advantages can be realized by reference to the following detailed description in which reference is made to the accompanying drawings in which.

DETAILED DESCRIPTION OF THE INVENTION

Figure 1:
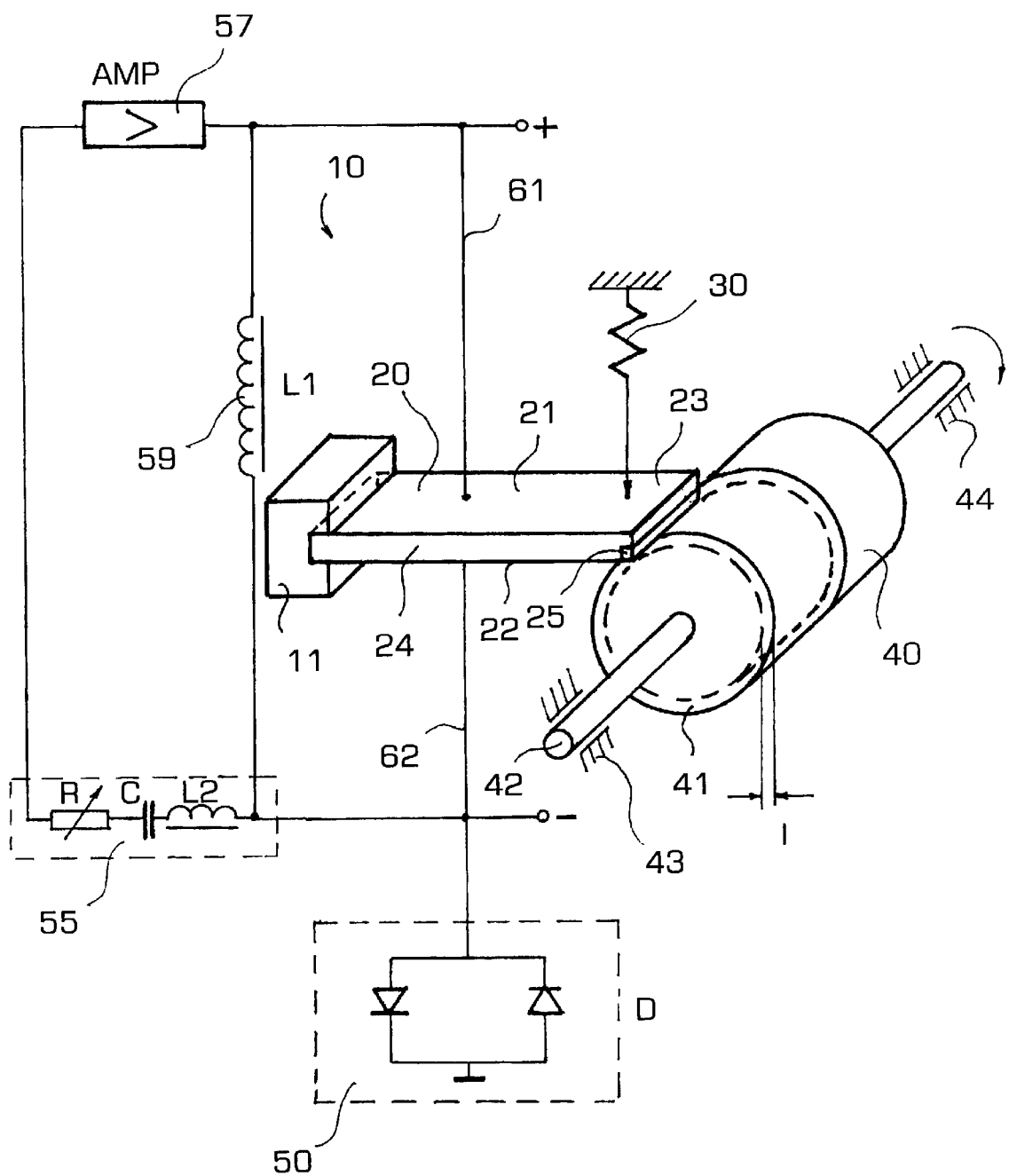
FIG. 1 is a highly schematic view of a piezoelectric actuator and a rotor of the present invention.

A detailed description of the present invention follows with reference to the accompanying drawings in which like elements are indicated by like reference numerals.

FIG. 1 illustrates a highly schematic view of the main components of the piezoelectric motor according to the present invention: an actuator (10) is engaged with a rotor (40) having a cylindrical shape. The actuator (10) in turn consists of a piezoelectric vibrator (20) clamped at one end (24) through the elastic insert (11) to the housing of the motor (not shown). At the other working end (23), the vibrator (20) is equipped with a hard to compress and wear resistant edge insert (25) made for example from corund or other type of ceramic or similar material. The top (21) and the bottom (22) surfaces of the vibrator (20) are having electrodes designed to accept respective electrical leads (61) and (62) of the electronic control unit supplying electrical current to cause the vibrator to oscillate. The urging means are designed in this case as a bias element (30), typically a leaf metal spring with optional adjustment screw (not shown), and is adapted to urge the edge insert (25) towards the rotor (40).

In turn, the rotor (40) has an external cylindrical surface (41) placed in direct contact with the edge insert (25) of the piezoelectric vibrator (20). Elongation of the vibrator (20) leads to compression of the surface (41) to a predetermined depth $\Delta l$ not exceeding the elastic limit of the rotor material so that the relative deformation $\epsilon$ along the line of contact of the rotor surface (41) does not exceed about 0.001. A shaft (42) supports the rotor (40) and is rotatably fixed in the housing via a couple of bearings (43) and (44) allowing for free rotation of the rotor (40).

Electronic control unit contains a pair of positive and negative terminals for attaching an external electrical DC power source such as a battery (not shown) to generate the alternating electrical current with an output at a frequency close to the longitudinal resonance frequency of the vibrator. In a stationary application, a regular plug-in AC power can also be used. The generator automatically adjusts the output frequency using well known feed back principles. The feed back voltage is obtained from a group of diodes (50) and is transmitted to the adjustment block (55) containing a variable resistance transistor R. Changing the resistance value of transistor R leads to corresponding increase or decrease of the oscillation voltage amplitude transmitted to the amplifier (57) which in turn allows for speed adjustment of the actuator (10).

Oscillation voltage is amplified by the amplifier (57) with zero phase shift and is fed directly or through an optional voltage transformer (not shown) to the pair of electrical leads (61) and (62) to energize the vibrator (20).

Inductive coil (59) is attached in parallel to the vibrator (20) and is designed to compensate for disturbances caused by the vibrator (20) and maintaining the zero phase shift of the feed back voltage.

In a "start/stop" mode of operation, this control unit may be connected to an optional external switching device (not shown) to form the necessary sequence of "on" and "off" intervals as may be required in some applications.

As discussed above, extended operational life of the device can be achieved by designing the edge insert (25) having substantially higher Young's modulus than the surface (41) of the rotor (40). More specifically, the edge insert of the working end of the vibrator should be made of a material with a Young's modulus $E_i$ in the range of between $1\times10^7$ N/cm$^2$ and $10\times10_7$ N/cm$^2$ and preferably about $5\times10^7$ N/cm$^2$ while a generally softer and more elastic surface of the roller should be made of a single or composite material having a Young's modulus $E_r$ in the range of between about $0.5\times10^6$ N/cm$^2$ and about $5\times10^6$ N/cm$^2$ and preferably about $2\times10^6$ N/cm$^2$. One practical way to obtain the correct Young's modulus for the surface of the rotor is to make the rotor laminated with the use of various commonly known materials (not shown on the drawings). By alternating harder and softer materials such as copper and paper or textile, the total Young's modulus of the rotor can be designed to be in the above mentioned range. Our calculations and experiments indicate that the optimum design of the rotor would include a combination of evenly alternating layers of copper and paper such that the thickness of copper is at least 5 times less than the thickness of paper.

In operation, periodic elongations of the vibrator (20) powered by the electronic control unit, cause the edge insert (25) to engage the surface of the rotor (40) forming a temporary microgroove such that the relative deformation $\epsilon$ along the line of contact of the rotor (40) stays within the natural elastic compression limits and does not exceed about 0.001. As a result, the vibrator (20) engages the rotor (40) as in a gear tooth mode and rotates it about the shaft (42). Subsequent contraction of the vibrator (20), traveling in essence in an elliptical fashion, disengages it from the rotor (40) and returns it to its initial length while the microgroove is resolved so that the surface of the rotor (40) returns to its initial shape. Bias spring (30) urges the vibrator (20) against the rotor (40) so that during the next elongation cycle, a new microgroove is formed along the new line of contact between the vibrator (20) and the rotor (40) and the rotation of the rotor (40) continues.

To further improve positioning and operational accuracy, an optional position sensor such as an optical sensor may be employed (not shown) to feed the exact position of the rotor to the electronic control unit.

Figure 2:
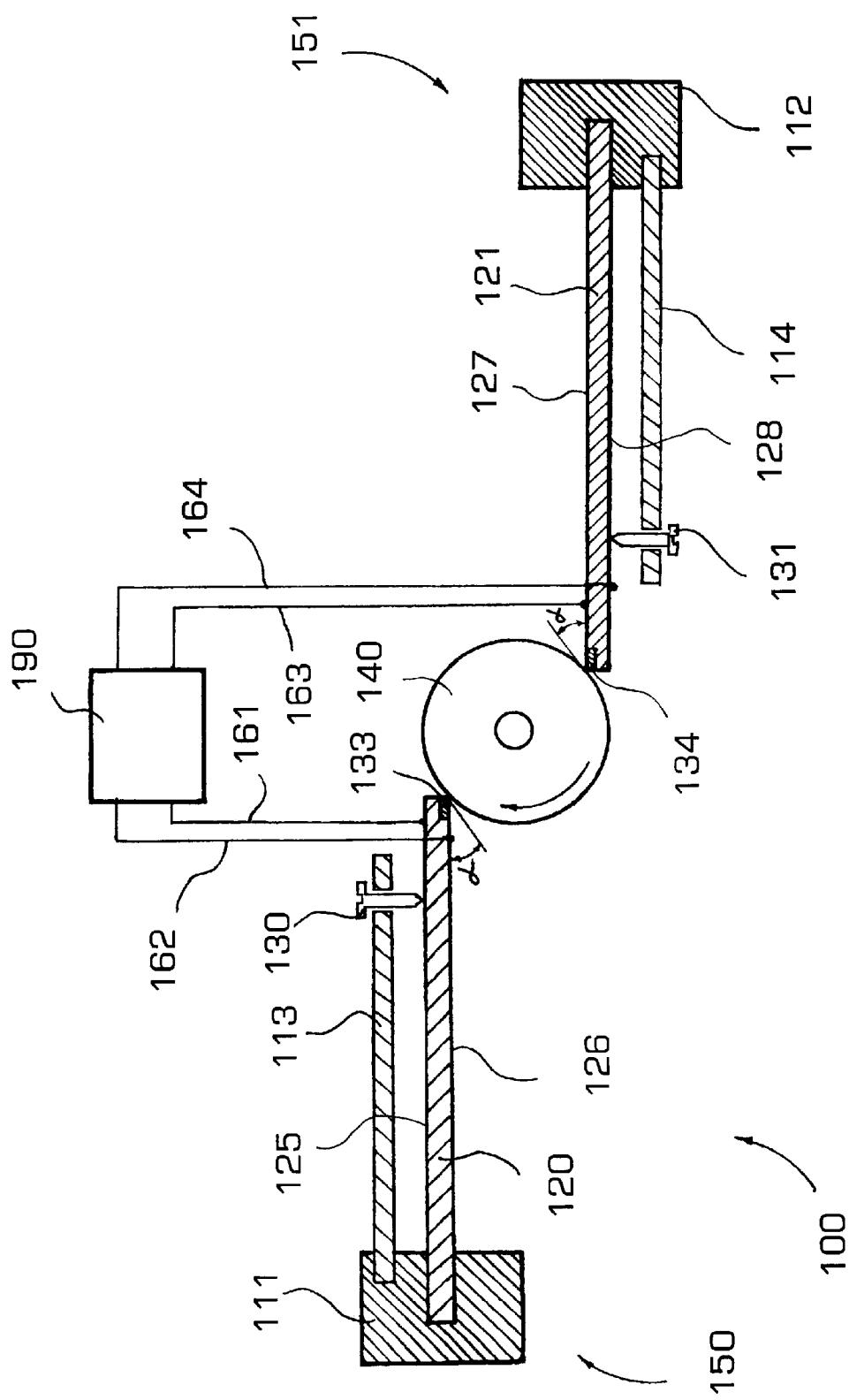
FIG. 2 is a cross-sectional view of the piezoelectric motor of the invention having two actuators which can be advantageously used as a disk drive device.

FIG. 2 represents a piezoelectric motor (100) having two actuators (150) and (151) for simultaneous engagement with the rotor (140). The first actuator (150) consists of a piezoelectric vibrator (120) appropriately wrapped at one end in an elastic insert (not shown) and clamped in a housing element (111) and having two contact surfaces (125) and (126) connected via electrical contacts (161) and (162) respectively to the electronic control unit (190). The working end of the vibrator (120) contains a hard edge insert (133) engaged with the surface of the rotor (140) by the urging action of the bias spring (113) which in turn contains an optional adjustment screw (130). The angle α between the vibrator (120) and the rotor (140) is chosen to be about 45°.

A second actuator (151) is preferably (but not necessarily) placed in symmetry with the first actuator (150). It appropriately consists of a piezoelectric vibrator (121) wrapped at one end in an elastic insert (not shown) and clamped in a housing element (112) and having two contact surfaces (127) and (128) connected via electrical contacts (163) and (164) respectively to the same electronic control unit (190). The working end of the vibrator (121) contains a hard edge insert (134) engaged with the surface of the rotor (140) by the urging action of its respective bias spring (114) which in turn also contains an optional adjustment screw (131). The angle α between the vibrator (121) and the rotor (140) is again chosen to be about 45°.

In a preferred mode of operation, the electronic control unit (190) energizes both actuators (150) and (151) in a synchronous mode so that elongations and contractions of both vibrators (120) and (121) occur at the same time. In that case, both vibrators engage the surface of the rotor (140) and advance it into rotation in a manner which was described in greater detail above.

More than two actuators can also be easily used in piezoelectric motors and drives of the present invention. Although not specifically illustrated, they would extend further the advantages of the present invention by providing even higher torque on a single rotor.

Figure 3:
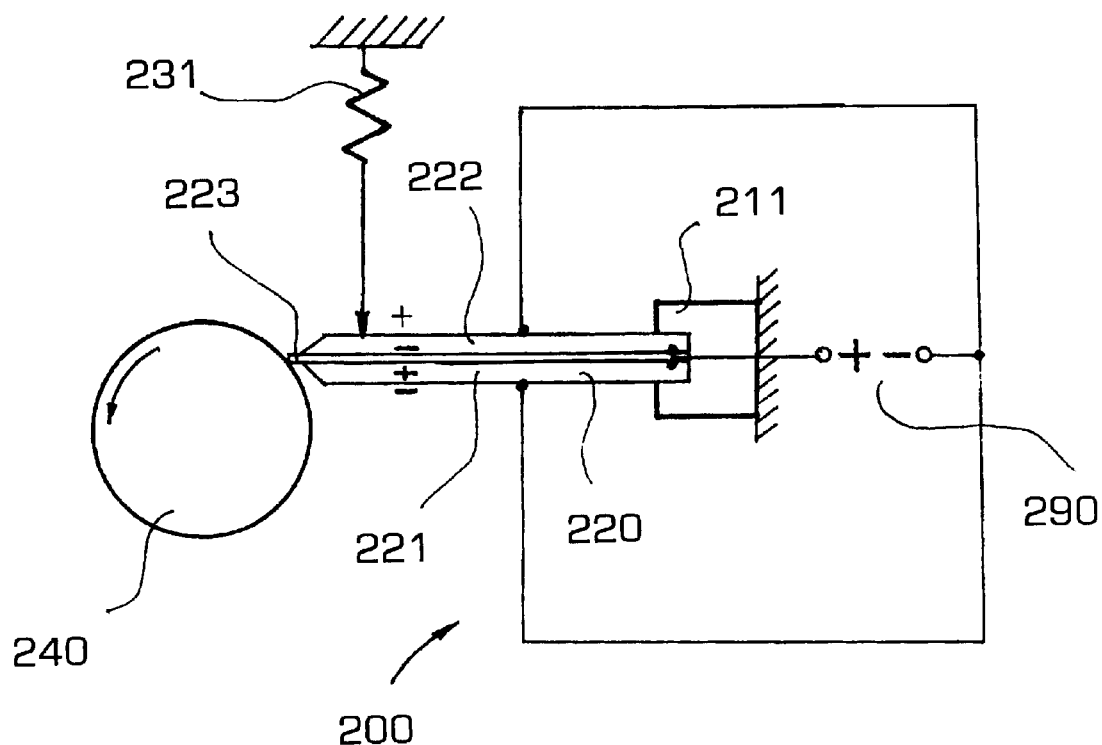
FIG. 3 is a highly schematic view of a variation of the piezoelectric motor having a laminated Vibrator.

FIG. 3 illustrates a laminated design of a actuator for a piezoelectric motor of the present invention. Here, the actuator (220) is affixed at one end in the elastic insert (211) and is engaged at the other working end with the rotor (240) while being urged by a bias spring (231) and being energized by an electronic control unit (290).

The actuator (220) consists of at least two piezoelectric vibrators (221) and (222) separated by a ceramic isolator (223) to form a laminated structure. The length of the isolator (223) extends beyond the length of both piezoelectric vibrators (221 ) and (222) at the working end of the actuator (220). Electrical leads of both piezoelectric vibrators (221) and (222) are connected respectively in parallel and attached to appropriate terminals of the electronic control unit (290). The edge of the ceramic isolator (223) extends beyond the actuator's piezoelectric vibrators and engages the rotor (240) during operation of the motor. The advantage of this arrangement is that the driving voltage may be reduced as a result of having an increased number of piezoelectric vibrators which is advantageous when using the independent sources of DC voltage such as electric batteries. As can be easily appreciated by those skilled in the art, multiple actuators each having a similar laminated design can be used in such applications as a disk drive (not shown).

Although the present invention is described for a specific version of a piezoelectric motor, it is not limited thereto. One example of an alternate design includes a hollow rotor and a vibrator, the working end of which is placed against the inside surface of the rotor for transmitting the rotational torque from the inside rather then from the outside of the rotor as has been mostly described above. Additionally, a linear ultrasonic motor can be conceived of using the above described contact principles of a micro-groove to utilize the advantages of the invention in various applications such as positioning devices. In that case, the working end of the vibrator is contacting a flat or curved contact surface of the moving element inducing a respective linear motion thereof. Numerous other variations and modifications would be readily appreciated by those skilled in the art and are intended to be included in the scope of the invention, which is restricted only by the following claims.

What is claimed is:

1. A piezoelectric motor comprising:
   a rotor of a cylindrical shape, said rotor having a natural elastic compression limit;
   a first actuator having a first piezoelectric vibrator, said first actuator positioned in linear contact with and urged against said rotor by a first urging means, said first vibrator including electrodes having first outgoing leads,
   a second actuator having a second piezoelectric vibrator, said second actuator positioned in linear contact with and urged against said rotor by a second urging means, said second vibrator including electrodes having second outgoing leads, and
   an electronic control unit, said control unit being connected to said first and second outgoing leads, said control unit causing periodic oscillations of said first and second vibrators,
   whereby periodic oscillations of said first and second piezoelectric vibrators causing compressions of said rotor and its rotation in a predetermined direction, said compressions not exceeding said natural elastic compression limit of said rotor, and cessation of said compressions causing said rotor to fully restore its initial cylindrical shape.

2. The piezoelectric motor as in claim 1, wherein said first actuator being identical to said second actuator, both of said first and second actuators placed symmetrically and opposite each other about said rotor.

3. The piezoelectric motor as in claim 2, wherein said periodic oscillations of said first and second vibrators being caused by said electronic control unit at a frequency close to a natural longitudinal resonance frequency of either of said vibrators.

4. The piezoelectric motor as in claim 2, wherein each of said first and second vibrators being respectively affixed in a stationary position at one end and having an opposite working end in linear contact with said rotor, both of said first and second vibrators placed against said rotor at an angle of about 45 degrees.

5. The piezoelectric motor as in claim 2, wherein the hardness of the working end of both said first and second vibrators as characterized by a Young's modulus being between about $1 \times 10^7$ N/cm$^2$ and about $10 \times 10^7$ N/cm$^2$.

6. The piezoelectric motor as in claim 5, wherein said rotor further comprising an outer surface, the hardness of said outer surface as characterized by a Young's modulus being between about $0.5 \times 10^6$ N/cm$^2$ and about $5 \times 10^6$ N/cm$^2$.

7. The piezoelectric motor as in claim 6, wherein the hardness of the working end of both said first and second vibrators as characterized by a Young's modulus being about $5 \times 10^7$ N/cm$^2$.

8. The piezoelectric motor as in claim 6, wherein the hardness of the outer surface of said rotor as characterized by a Young's modulus being about $2 \times 10^6$ N/cm$^2$.

9. The piezoelectric motor as in claim 6, wherein said rotor further comprising a composite structure having a layer of a softer material and a layer of a harder material, whereby the overall hardness of the structure as characterized by a Young's modulus being between about $0.5 \times 10^6$ N/cm$^2$ and about $5 \times 10^6$ N/cm$^2$.

10. The piezoelectric motor as in claim 9, wherein the total thickness of said softer layer being at least 5 times higher than the total thickness of said harder layer.

11. The piezoelectric motor as in claim 1, wherein said first actuator further comprising a third piezoelectric vibrator and a first isolator placed between said first and said third piezoelectric vibrators to form a first laminated structure, said second vibrator having respective electrodes with second outgoing leads; said second actuator further comprising a fourth piezoelectric vibrator and a second isolator placed between said second and said fourth piezoelectric vibrators to form a second laminated structure, said fourth vibrator having respective electrodes with fourth outgoing leads; said first, second, third, and fourth leads being connected to said electronic control unit in parallel to cause synchronous periodic oscillations of said first, second, third, and fourth vibrators respectively.

12. The piezoelectric motor as in claim 11, wherein said third vibrator having a working end positioned adjacent the working end of the first vibrator, said first isolator extending beyond both working ends of said first and said third piezoelectric vibrators, said first isolator positioned in direct contact with said rotor; said fourth vibrator having a working end positioned adjacent the working end of the second vibrator, said second isolator extending beyond both working ends of said second and said fourth piezoelectric vibrators, said second isolator positioned in direct contact with said rotor.

13. The piezoelectric motor as in claim 12, wherein said first actuator being identical to said second actuator, both of said first and second actuators placed symmetrically and opposite each other about said rotor.

14. The piezoelectric motor as in claim 13, wherein the respective hardness of said first and second isolators as characterized by a Young's modulus being between about $1 \times 10^7$ N/cm$^2$ and about $10 \times 10^7$ N/cm$^2$.

15. A disk drive comprising:
   a rotor of a cylindrical shape, said rotor having a natural elastic compression limit, said rotor adapted to drive a disk;
   a first actuator having a first piezoelectric vibrator, said first actuator positioned in linear contact with and urged against said rotor by a first urging means, said first vibrator including electrodes having first outgoing leads,
   a second actuator having a second piezoelectric vibrator, said second actuator positioned in linear contact with and urged against said rotor by a second urging means, said second vibrator including electrodes having second outgoing leads, and
   an electronic control unit, said control unit being connected to said first and second outgoing leads, said control unit causing periodic oscillations of said first and second vibrators,
   whereby periodic oscillations of said first and second piezoelectric vibrators causing compressions or said rotor and its rotation in a predetermined direction defining a direction of rotation of said disk, said compressions not exceeding said natural elastic compression limit of said rotor, and cessation of said compressions causing said rotor to fully restore its initial cylindrical shape.

16. The disk drive as in claim 15, wherein said first actuator being identical to said second actuator, both of said first and second actuators placed symmetrically and opposite each other about said rotor.

17. The disk drive as in claim 16, wherein each of said first and second vibrators being respectively affixed in a stationary position at one end and having an opposite working end in linear contact with said rotor, both of said first and second vibrators placed against said rotor at an angle of about 45 degrees.

18. The disk drive as in claim 16, wherein the hardness of the working end of both said first and second vibrators as characterized by a Young's modulus being between about $1 \times 10^7$ N/cm$^2$ and about $10 \times 10^7$ N/cm$^2$.

19. The disk drive as in claim 16, wherein said rotor further comprising an outer surface, the hardness of said outer surface as characterized by a Young's modulus being between about $0.5 \times 10^6$ N/cm$^2$ and about $5 \times 10^6$ N/cm$^2$.

20. The disk drive as in claim 16, wherein the hardness of the working end of both said first and second vibrators as characterized by a Young's modulus being about $0.5 \times 10^7$ N/cm$^2$.

21. The disk drive as in claim 16, wherein the hardness of the outer surface of said rotor as characterized by a Young's modulus being about $2 \times 10^6$ N/cm$^2$.

22. The disk drive as in claim 16, wherein said rotor further comprising a composite structure having a layer of a softer material and a layer of a harder material, whereby the overall hardness of the structure as characterized by a Young's modulus being between about $0.5 \times 10^6$ N/cm$^2$ and about $5 \times 10^6$ N/cm$^2$.

23. The disk drive as in claim 15, wherein said first actuator further comprising a third piezoelectric vibrator and a first isolator placed between said first and said third piezoelectric vibrators to form a first laminated structure, said second vibrator having respective electrodes with second outgoing leads; said second actuator further comprising a fourth piezoelectric vibrator and a second isolator placed between said second and said fourth piezoelectric vibrators to form a second laminated structure, said fourth vibrator having respective electrodes with fourth outgoing leads; said first, second, third, and fourth leads being connected to said electronic control unit in parallel to cause synchronous periodic oscillations of said first, second, third, and fourth vibrators respectively.

24. The disk drive as in claim 23, wherein said third vibrator having a working end positioned adjacent the working end of the first vibrator, said first isolator extending beyond both working ends of said first and said third piezoelectric vibrators, said first isolator positioned in direct contact with said rotor; said fourth vibrator having a working end positioned adjacent the working end of the second vibrator, said second isolator extending beyond both working ends of said second and said fourth piezoelectric vibrators, said second isolator positioned in direct contact with said rotor.

25. The disk drive as in claim 24, wherein the respective hardness of said first and second isolators as characterized by a Young's modulus being between about $1 \times 10^7$ N/cm$^2$ and about $10 \times 10^7$ N/cm$^2$.

26. A piezoelectric motor comprising:
   a rotor having a natural elastic compression limit, said rotor having an outer surface of a cylindrical shape, the hardness of said outer surface as characterized by a Young's modulus being between about $0.5 \times 10^6$ N/cm$^2$ and about $5 \times 10^6$ N/cm$^2$;
   a first actuator including a first piezoelectric vibrator, said first actuator having a working end equipped with a hard edge insert, said hard edge insert positioned in linear contact with and urged against said outer surface of said rotor by an urging means, said first vibrator including electrodes having outgoing leads; and
   an electronic control unit connected to said outgoing leads of said first vibrator, said control unit causing periodic oscillations of said first vibrator,
   whereby periodic oscillations of said first piezoelectric vibrator causing compressions of said rotor and its rotation in a predetermined direction, said compressions not exceeding said natural elastic compression limit of said rotor, and cessation of said compressions causing said outer surface of said rotor to fully restore its initial cylindrical shape.

27. The piezoelectric motor as in claim 26, wherein the hardness of said hard edge insert as characterized by a Young's modulus being between about $1 \times 10_7$ N/cm$^2$ and about $10 \times 10_7$ N/cm$^2$.

28. The piezoelectric motor as in claim 27, wherein the hardness of said edge insert as characterized by a Young's modulus being about $5 \times 10^7$ N/cm$^2$.

29. The piezoelectric motor as in claim 26, wherein the hardness of the outer surface of said rotor as characterized by a Young's modulus being about $2 \times 10^6$ N/cm$^2$.

30. The piezoelectric motor as in claim 26, wherein during periodic compressions of the outer surface of said rotor by said first actuator not exceeding said natural elastic compression limit, a relative deformation of said outer surface of said rotor not exceeding about 0.001.

31. The piezoelectric motor as in claim 26, wherein said rotor further comprising a composite structure having a layer of a softer material and a layer of a harder material, whereby the overall hardness of the structure as characterized by a Young's modulus being between about $0.5 \times 10_6$ N/cm$^2$ and about $5 \times 10^6$ N/cm$^2$.

32. The piezoelectric motor as in claim 31, wherein the total thickness of said softer layer being at least 5 times higher than the total thickness of said harder layer.

33. The piezoelectric motor as in claim 31, wherein said softer material being textile and said harder material being copper.

34. The piezoelectric motor as in claim 31, wherein said softer material being paper and said harder material being copper.

35. The piezoelectric motor as in claim 26, wherein said first actuator further comprising a second piezoelectric vibrator and a first isolator placed between said first and said second piezoelectric vibrators to form a laminated structure, said second vibrator having respective electrodes with outgoing leads, said leads of the second vibrator being connected to said electronic control unit in parallel with said leads of the first vibrator to cause synchronous periodic oscillations of both the first and the second vibrators.

36. The piezoelectric motor as in claim 35, wherein said first isolator extending beyond both said first and said second piezoelectric vibrators, said first isolator positioned in direct contact with said rotor.

37. The piezoelectric motor as in claim 36, wherein the hardness of said first isolator as characterized by a Young's modulus being between about $1 \times 10^7$ N/cm$^2$ and about $10 \times 10^7$ N/cm$^2$.

* * * * *